United States Patent [19]

Short

[11] 3,734,639
[45] May 22, 1973

[54] TURBINE COOLING
[75] Inventor: Frederick R. Short, Indianapolis, Ind.
[73] Assignee: General Motors Corporation, Detroit, Mich.
[22] Filed: Jan. 25, 1968
[21] Appl. No.: 701,815

[52] U.S. Cl. .....................415/114, 415/178, 416/96
[51] Int. Cl. .............................................F01b 3/22
[58] Field of Search ..................60/39.66; 253/39.15; 415/114

[56] References Cited

UNITED STATES PATENTS

| | | | |
|---|---|---|---|
| 2,647,368 | 8/1953 | Triebbnigg et al. | 60/39.66 |
| 2,783,613 | 3/1957 | Von Zborowski | 60/39.66 |
| 2,945,671 | 7/1960 | Petrie | 253/39.15 |

Primary Examiner—Samuel Feinberg
Attorney—G. N. Shampo and Paul Fitzpatrick

[57] ABSTRACT

A gas turbine engine in which the hotter parts of the engine are cooled by circulation of a cold fuel. The fuel cools parts of the combustion chamber wall, the exhaust duct, and the struts which extend across the exhaust duct, and the nozzle vanes and turbine wheel, including the turbine blades. This is a regenerative cooling system, since the heat imparted to the fuel is recovered in the combustion and expansion processes. The turbine wheel cooling embodies a circuit in which cold fuel flows radially outward of both faces of the turbine wheel, radially outward in the leading portion of the turbine blades, radially inward in the trailing portion of the turbine blades, and radially inward behind the turbine wheel to the coolant outlet. Preferably the fluid is vaporized in effecting the cooling.

7 Claims, 12 Drawing Figures

INVENTOR.
Frederick R. Short
BY
Paul Fitzpatrick
ATTORNEY

INVENTOR.
Frederick R. Short
BY Paul Fitzpatrick
ATTORNEY

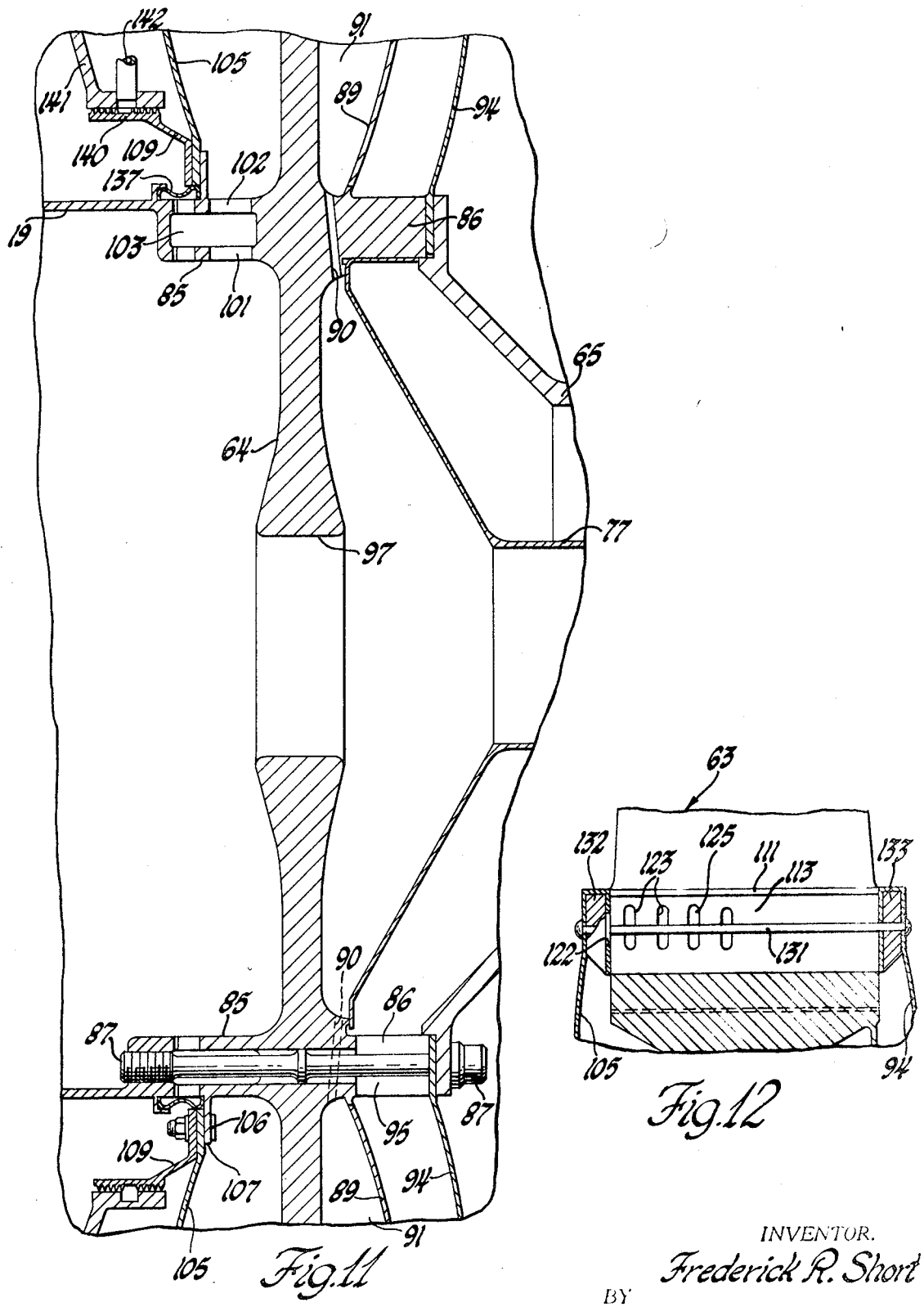

TURBINE COOLING

The invention herein described was made in the course of work under a contract or subcontract thereunder with the Department of Defense.

My invention relates to the cooling of turbines and particularly to the cooling of gas turbine engines intended for aircraft service. It involves cooling by circulation of fuel through the hot parts of the engine to the combustion apparatus in which it is burned. The invention is particularly useful in the case of engines operating at high forward speed, in which the ram temperature of the entering air is relatively high.

The principal objects of my invention are to improve the cooling of turbine engines, to provide an efficient regenerative cooling system for such engines, to provide an effective system for cooling the turbine nozzle and rotating parts of the turbine by circulation of fuel through them, and to provide improved jet engines capable of high speed operation.

The nature of my invention and the advantages thereof will be clear to those skilled in the art from the succeeding detailed description of the preferred embodiment of the invention and the accompanying drawings thereof.

Figure 3:
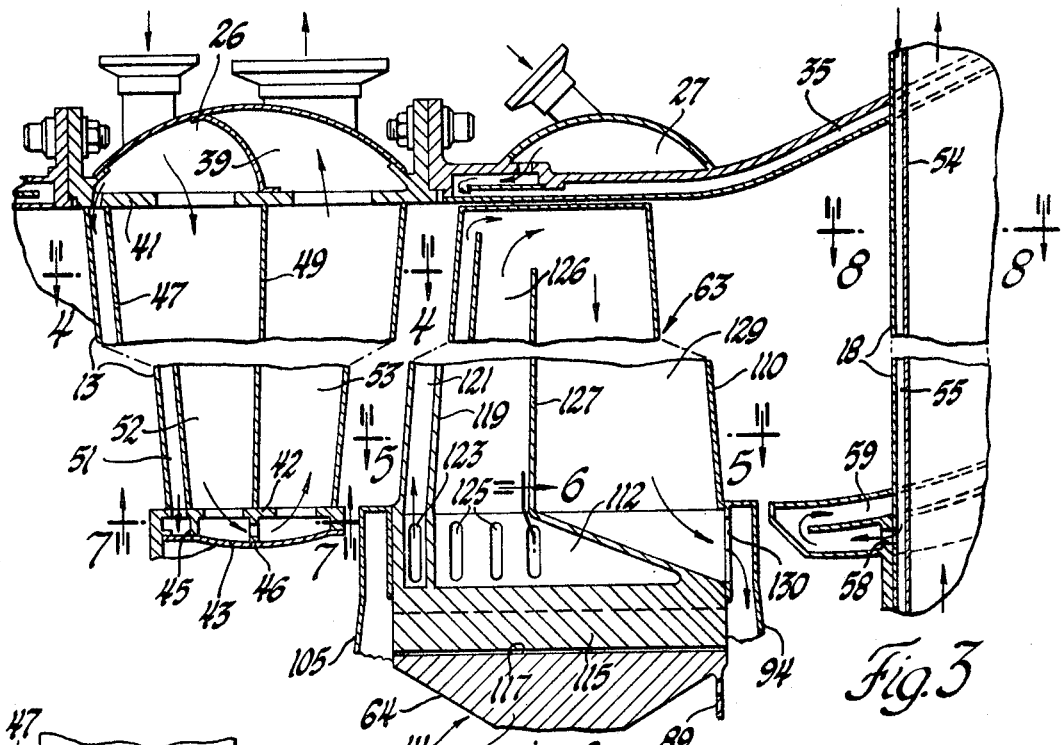
FIG. 3 is a further enlarged view of a portion of FIG. 2.

FIGS. 4, 5, 6, 7, and 8 are detail sectional views taken on the planes indicated in FIG. 3.

Figure 9:
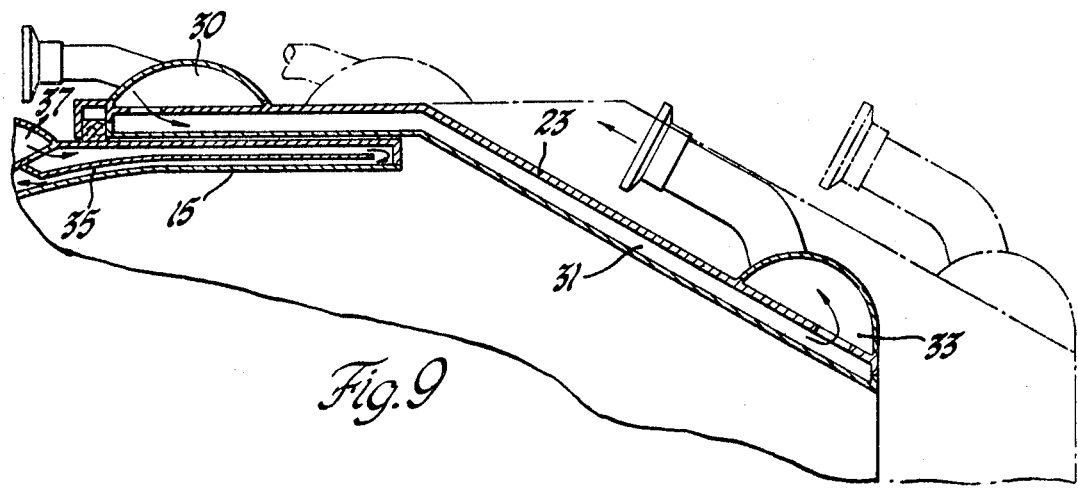

FIG. 9 is a longitudinal sectional view of the rear end of the outer exhaust duct wall.

Figure 10:
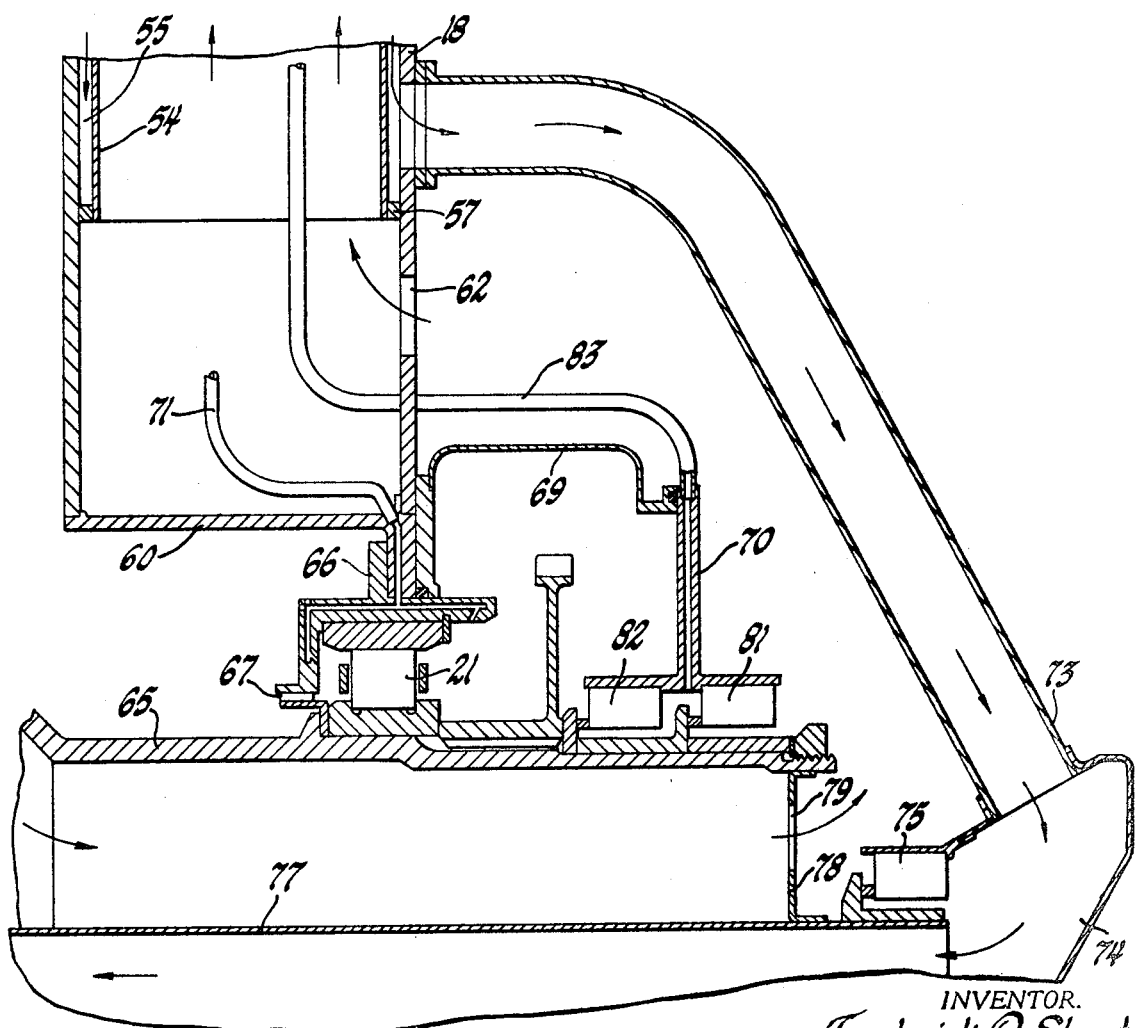

FIG. 10 is an enlarged sectional view of the turbine shaft, bearings, seals, and supports, taken on a plane containing the axis of the engine.

FIG. 11 is an axial sectional view of the central portion of the turbine wheel.

FIG. 12 is an axial sectional view of the turbine wheel rim between blade roots.

Figure 1:
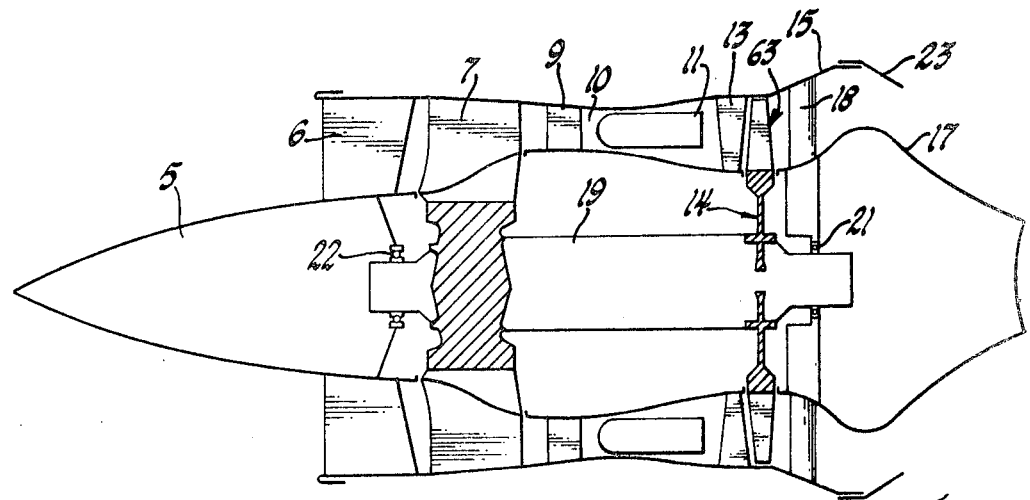
FIG. 1 is a simplified or schematic representation of a turbojet engine taken on a plane containing the axis of the engine.

Referring first to FIG. 1, the engine includes an inlet spike 5, an air inlet including guide vanes 6, a single stage compressor rotor 7, outlet guide vanes 9, a diffuser 10, combustion apparatus 11, turbine nozzle vanes 13, a bladed turbine wheel 14, an exhaust duct 15, and an inner exhaust cone 17. Struts 18 extending across the exhaust duct support the rear end of a turbine-compressor shaft 19 by a roller bearing 21. A ball thrust bearing 22 supports the forward end of shaft 19. The engine operates by compressing the air entering the inlet, diffusing it, burning fuel in it, expanding the combustion products through the turbine 13, 14, and discharging the combustion products through the exhaust duct 15 for a propulsive jet. An axially movable exhaust shroud 23 is capable of varying the area of the jet nozzle. The cooling system according to my invention preferably makes use of a cold liquefied gas which is heated and normally vaporized in cooling the hot parts of the engine, the resulting gaseous fuel then being supplied to the combustion apparatus of the engine.

Figure 2:
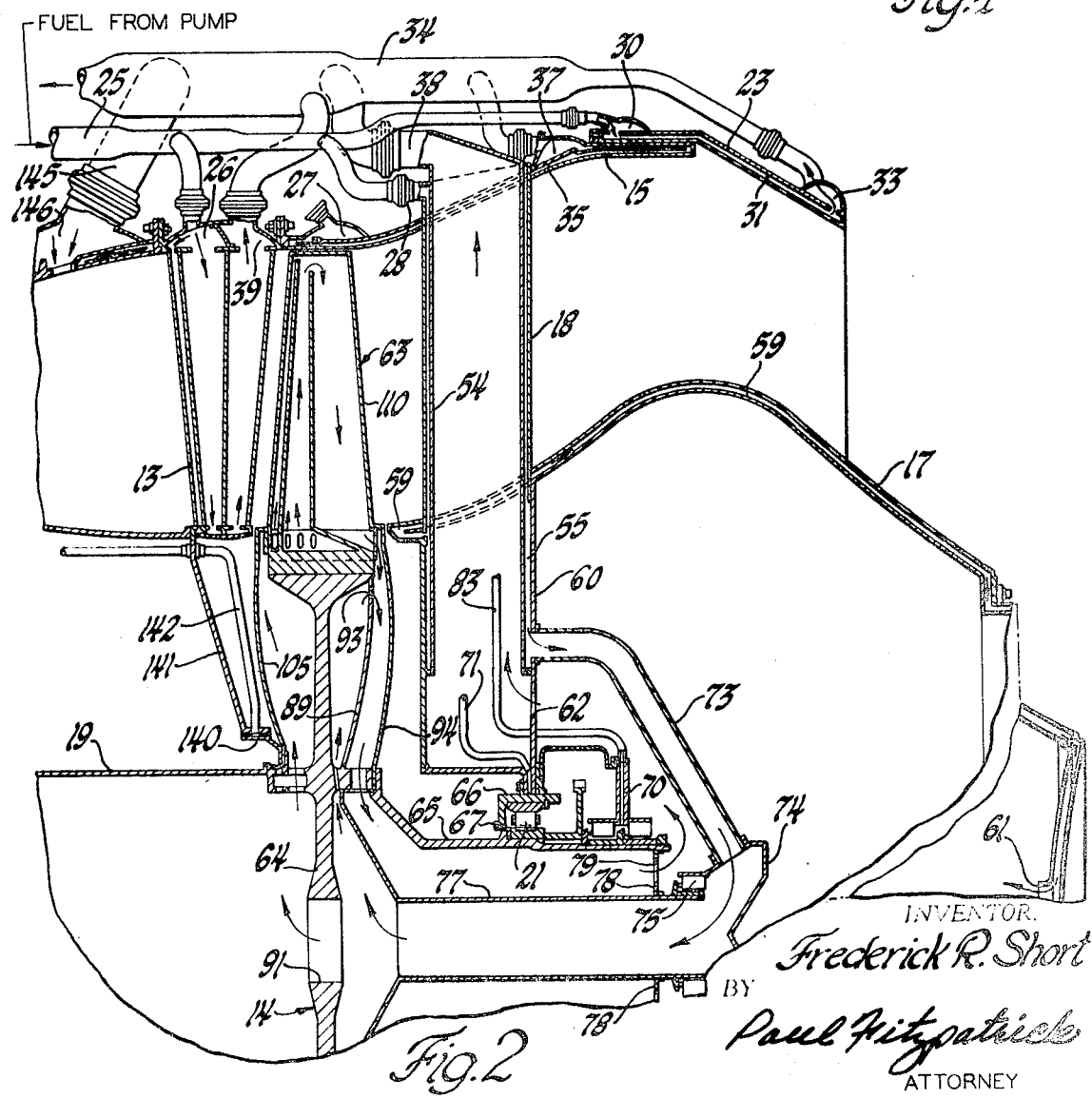
FIG. 2 is a sectional view of the turbine portion of the engine taken on a plane containing the axis thereof.

FIG. 2 shows the cooling fuel supply and return lines, and FIGS. 2, 3, 8, and 9 show elements of the fuel circulation apart from the circulation within the turbine.

The engine has eight fuel supply pipes 25 running from the forward part of the engine toward the rear. Each such fuel supply pipe has a branch connection to a manifold 26 encircling the engine which supplies the turbine nozzle 13, a branch connection (not illustrated) to an annular manifold 27 which supplies the outer wall of the exhaust duct, a branch connection to an inlet 28 to one of the eight struts 18, and a connection to an annular manifold 30 at the forward end of the axially movable variable nozzle shroud 23. The shroud 23 is double-walled, providing a passage 31 to a manifold 33 at its rear end which discharges into each of eight heated fuel return or outlet pipes 34. The connections to shroud 23 include flexible conduits to permit axial movement of the shroud.

Fuel circulating from the manifold 27 through a passage 35 in the double-walled outer exhaust duct wall 15 is delivered to a manifold 37 connected to the return pipe 34. Each strut has a return connection 38, and the turbine nozzle communicates with a manifold 39 encircling the engine which also is piped to the return fuel lines 34.

Figure 4:
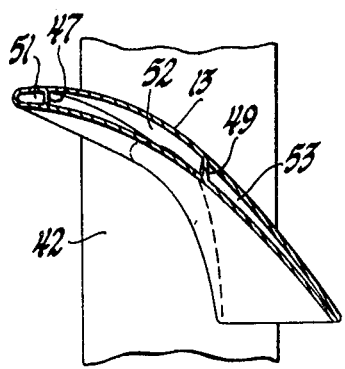
Figure 5:
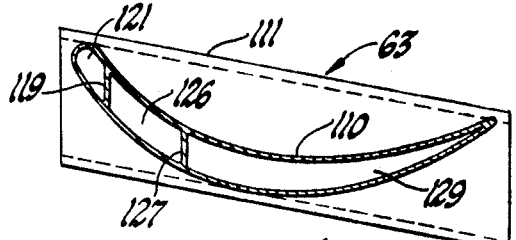
Figure 6:
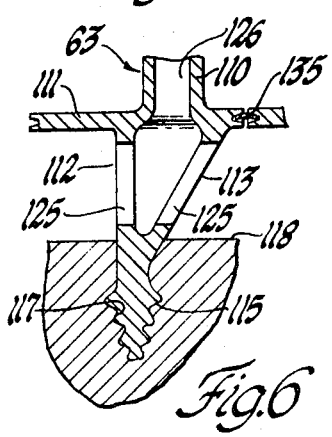
Figure 7:
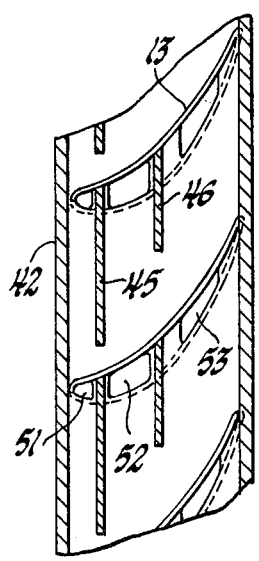
Figure 8:
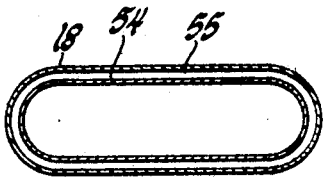

Considering now the turbine nozzle cooling, with particular reference to FIGS. 3, 4, and 7, the nozzle blading is provided by vanes 13 which extend from an annular outer shroud 41 which is a section of the outer case of the engine. The manifolds 26 and 39 are provided by sheet metal structures welded to the outer surface of the shroud. The vanes 13, which are hollow, project inwardly from and are welded to the inner surface of the shroud. The inner end of each vane is welded to an inner shroud ring 42. A sheet metal ring 43 is welded or brazed to flanges at the front and rear edges of the inner shroud and engages ridges 45 and 46 extending inwardly from the shroud.

Vanes 13, which are of suitable airfoil section, are provided with two webs 47 and 49 extending from face to face of the vane, the web 47 being adjacent the leading edge and the web 49 approximately at the mid-chord of the vane. The hollow vane thus defines three passages 51, 52, and 53, the passage 51 being immediately adjacent the leading edge; the passage 52 being within generally the forward half of the vane, and the passage 53 within the rear half of the vane. Passages 51 and 52 are supplied from the manifold 26 through openings in the outer shroud and exhaust into the interior of the inner shroud. The interior of the inner shroud is connected through holes in that shroud to the passages 53 of the vanes which in turn are connected through holes in the outer shroud to the manifold 39. There is, thus, a path for circulation of fuel leading radially inward through the forward half of the vane and outwardly through the rearward half of the vane. This circulation cools the outer shroud, the vanes, and the inner shroud. The reason for providing both passage 51 and passage 52 is to provide a greater flow of fluid through the leading edge of the vane, which is most highly heated in operation of the engine. The relative amounts of fuel flowing through passages 51 and 52 may be controlled by properly sizing the holes which connect them to the outer and inner shroud manifolds.

Circulation of cooling fuel to the inner cone 17 and turbine rotor 14 is effected through the eight struts 18. As shown in FIGS. 2, 3, 8, and 10, the radially outer portion of each strut is double-walled and of an oval cross-section. Struts 18 connect to an annular support 60 for bearing 21. A tube 54 within the strut defines with the strut a passage 55 through which fuel flows radially inwardly of the engine from the connection 28. The passages 55 terminate within the support 60 at a ring 57 bridging the gap between the front and rear walls of support 60. The passages 55 have outlets 58 from the forward wall of the strut into an annular passage 59 within the double wall of the inner cone 17. Fuel thus supplied to the inner cone flows rearwardly and inwardly to an outlet 61 and into the interior of the cone at the axis of the engine. Thus, the surface of the inner cone is cooled by the rearward flow of fuel through it. The fuel returning from the inner cone enters bearing support 60 through openings 62 within the tailcone and flows radially outward through the tube 54 to the strut fuel outlet connection 38.

Before describing the cooling of the turbine blades, the structure of the turbine wheel assembly 14 may be described briefly. Turbine blades 63 are mounted on a turbine wheel 64 which is bolted to the shaft 19 leading to the compressor and to a stub shaft 65 supported in the roller bearing 21, which in turn is mounted by ring 66 in support 60. The forward end of bearing 21 is isolated from the turbine by a labyrinth seal 67. An oil sump behind the bearing is defined by an annular housing comprising an outer barrel 69 and a rear plate 70. The bearing is lubricated by oil circulated through a pipe 71 extending through one of the struts 18. The oil scavenge arrangement is not illustrated. To supply the cooling fuel to the turbine, support 60 is connected by one or more fuel pipes 73 to a manifold 74 on the turbine axis immediately to the rear of stub shaft 65. Manifold 74 is connected through a suitable semi-contact type seal 75 to an inlet tube 77 mounted concentrically within the stub shaft 65, connected at its forward end to the turbine wheel and supported at its rear end by an annular disk 78. An outlet for the fuel which has cooled the turbine wheel is provided between the stub shaft 65 and tube 77, the fuel discharging through openings 79 in the disk 78 into the interior of the inner cone from which, as previously stated, the fuel enters the tubes 54 through openings 62. The rear plate 70 of the oil sump bears seals 81 and 82 disposed in series between the interior of the inner cone and the interior of the oil sump. Seals 81 and 75 are of a known type of controlled seals in which the relatively moving parts are substantially in contact so as to substantially prevent flow while minimizing or eliminating friction. Seal 82 is a contact type seal, oil lubricated. Seals 82 and 81 act against flanges fixed to the stub shaft 65. Any leakage of fuel through seal 81 is vented through a passage in the rear plate 70 and a vent tube 83 extending to a suitable discharge point outside the engine through one of the struts 18.

As previously stated, the inlet tube 77 on the axis of the turbine wheel 64 carries the cooling fuel to the wheel and the annulus between this tube and stub shaft 65 serves to discharge the coolant from the turbine wheel. Referring to FIG. 11, the turbine wheel 64 has a forward flange 85 which is splined to the shaft 19 and a rear flange 86 within which is piloted the forward end of stub shaft 65. Cap screws 87 extend through the forward end of the stub shaft and the flanges 86 and 85 and thread into the rear end of shaft 19, thus holding the rotor assembly together. A baffle or shroud 89 is welded to the outer surface of flange 86 near the disk of the turbine wheel and to the inside of the rim of the wheel adjacent its rear edge. A number of radial coolant holes 90 extending through the flange 86 allow fuel to flow from the inlet tube 77 into a wheel cooling space 91 between the baffle 89 and the turbine wheel. A number of small holes 93 (FIG. 2) adjacent the outer margin of baffle 89 permit this fuel to be discharged from the space 91 after it has flowed outwardly, cooling the rear face of the turbine wheel and the rear flange of the turbine wheel rim.

A removable shroud 94 has its inner edge mounted between the stub shaft 65 and the rear flange 86 where it is held by the cap screws 87 and has its outer edge bearing against the rear face of the turbine wheel and rear ends of the blade roots (see FIGS. 2, 3, and 12). Shrouds 89 and 94 define between them a coolant return path into the stub shaft 65. The coolant, which has been vaporized at this point, flows through a number of large slots 95 in the rear flange 86 and thus out through the annulus between tube 77 and stub shaft 65. Coolant in excess of that which flows through the holes 90 in the flange flows through a central hole 97 in the turbine wheel to the forward face of the wheel, where it flows outwardly through a ring of radial holes 101 and 102 and a central annular void 103 in the forward flange 85. This cooling fuel flows radially outwardly between the forward face of the turbine wheel 64 and the forward shroud 105, which extends from the forward flange 85 to the rim of the wheel, as is apparent from FIGS. 3 and 12. Shroud 105 is held to the wheel by bolts 106 passing through a radially extending flange 107 on the wheel, which also fix a labyrinth seal ring 109 to the forward face of the wheel ahead of shroud 105.

As shown in FIGS. 3 and 12, the outer edges of shrouds 105 and 94 are turned inwardly to a diameter near the inner boundary of the turbine blade roots. The outer rims of shrouds 94 and 105 are held against the faces of the turbine wheel and the forward and rear ends of the turbine blade roots. As shown in FIGS. 3, 5, 6, and 12, each blade 63 includes a hollow airfoil portion 110, a platform 111, two webs 112 and 113 defining a blade stalk, and a blade root 115. Each blade root is engaged in a blade slot 117 extending across the rim portion 118 of the wheel. The two webs 112 and 113 and the two faces of the airfoil portion of the blade are spaced to define a hollow structure through which the cooling fuel may flow. A wall 119 extending from face to face of the blade adjacent the leading edge defines with the webs 112 and 113 and the leading edge portion of the blade airfoil a coolant passage 121 extending radially outward from within the platform to the tip of the blade. Fuel flowing outwardly between shroud 105 and the forward face of the wheel enters the space between the outer diameter of the wheel and the blade platforms 111 through discharge holes 122 (FIG. 12) distributed around the inwardly directed flange at the outer edge of shroud 105. The fuel thus discharged into this space can flow through holes 123 in each of webs 112 and 113 and thus into the passage 121. Additional holes 125 in the webs 112 and 113, similar to holes 123, allow fuel to flow from within the platform into a second passage 126 in the blade defined by the side walls of the blade, the wall 119, and a wall 127. The portion of wall 127 between the webs 112 and 113 extends rearwardly to the rear end of the blade root, as shown clearly in FIG. 3. Coolant flowing outwardly through the passages 121 and 126 is contained within the blade by the closed outer end and flows rearwardly and inwardly through a coolant return passage 129 in the rear part of the blade chord aft of wall 127.

The space between webs 112 and 113 is open at the rear end of the blade root so that the coolant can flow out of the blade below the platform into the space between the wheel rim and shroud 94. Holes 130 are provided in the inwardly directed portion of the rim of shroud 94 for this purpose. Thus, the coolant which has flowed between the wheel and shroud 89 as well as that which has flowed through the blades returns between shrouds 89 and 94 to the stub shaft and is discharged from the wheel.

The shrouds 105 and 94 are held against the faces of the turbine wheel by rivets 131 (FIG. 12) extending from the forward face of shroud 105 through the rear face of shroud 94. Blocks 132 and 133 bonded into the margins of the shrouds resist the compression due to the rivets.

Seal strips 135 inserted in slots in the adjoining edges of the blade platforms seal the gaps between the platforms to prevent significant escape of the coolant into the motive fluid path between the blade platforms.

Referring to FIG. 11, a sheet metal ring 137 provides a seal between the turbine wheel and shaft 19 at the splines between the two. A double labyrinth seal 140 at the forward face of the turbine wheel is defined by ring 109 and fixed structure 141 of the engine. The center of this seal is pressurized by air supplied through pipe 142. The fuel which is used for cooling is supplied by suitable pumping means which puts it under sufficient pressure for circulation. Also, centrifugal force aids the circulation through the turbine rotor. The fuel which has cooled the various parts of the engine returns to conduits 34, from which fuel for combustion is diverted through supply pipes 145 to an annular manifold 146 (FIG. 2) from which it flows into the combustion apparatus 11. The structure of the combustion apparatus is immaterial to the present invention, and therefore it will not be described herein.

It will be clear to those skilled in the art that the cooling of the hot parts of the engine by very cold fuel and the heating, including, if desired, the evaporation or vaporization, of the fuel in these hot parts permits of a very high degree of cooling of those parts of the engine particularly exposed to hot motive fluid. It thus permits the use of a very high temperature motive fluid, with accompanying high efficiency and output. The heat taken from these hot parts of the engine is not wasted, since it is regenerated into the combustion process by the use of the heated fuel for combustion. As will be apparent, various features of the invention may be employed advantageously without others of those described herein. Also, various modifications of structure may be made without departing from the scope of the invention.

I claim:

1. A turbine rotor comprising, in combination, a wheel having a rim, an annular row of hollow blades mounted on and extending from the rim, supply and return conduits for a coolant terminating adjacent the wheel at the wheel axis, a first annular shroud on one face of the wheel defining with the wheel a chamber connected to and supplied from the supply conduit, means within the blades providing a coolant circulation loop having an entrance connected to the said chamber and having an exit, second and third mutually spaced annular shrouds on the other face of the wheel defining between them a coolant return path connecting the blade coolant circulation loops to the coolant return conduit, the second shroud being between the wheel and the third shroud and defining a wheel cooling space with the wheel, and means connecting the wheel cooling space to the coolant supply conduit and the coolant return conduit.

2. A rotor as recited in claim 1 in which the said first and third shrouds are removably mounted on the wheel.

3. A rotor as recited in claim 2 including tension members mutually coupling the peripheral portions of the first and third shrouds.

4. A high temperature turbomachine including a row of fluid directing airfoil members exposed to hot motive fluid, each airfoil member having a leading edge, a trailing edge, and two sides extending from the leading edge to the trailing edge, the airfoil member being hollow so as to define an internal cavity between the sides, two walls extending spanwise of the airfoil member from side to side so as to divide the cavity into three passages, one adjacent the leading edge, one adjacent the trailing edge, and an intermediate passage between the other two passages, means for distributing a cooling fluid into the leading edge and intermediate passages at one end of the airfoil member for flow spanwise through the member, means connecting the leading edge and intermediate passages to the trailing edge passage at the other end of the airfoil member, and means providing an outlet for the cooling fluid at the said one end of the airfoil.

5. A turbomachine as recited in claim 4 in which the said connecting means is within the airfoil member.

6. A turbomachine as recited in claim 4 including an annular shroud connected to the said other end of each airfoil member, the shroud defining the said connecting means.

7. A turbomachine as recited in claim 4 in which the distributing means includes metering orifices providing entrances to the said passages.

* * * * *